United States Patent
Kawai

(10) Patent No.: US 8,301,763 B2
(45) Date of Patent: Oct. 30, 2012

(54) AIR CONDITIONING SYSTEM

(75) Inventor: Seiji Kawai, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 12/674,934

(22) PCT Filed: Aug. 28, 2008

(86) PCT No.: PCT/JP2008/065364
§ 371 (c)(1),
(2), (4) Date: Feb. 28, 2011

(87) PCT Pub. No.: WO2009/028587
PCT Pub. Date: Mar. 5, 2009

(65) Prior Publication Data
US 2011/0145395 A1    Jun. 16, 2011

(30) Foreign Application Priority Data
Aug. 31, 2007   (JP) ................................ 2007-226469

(51) Int. Cl.
*G06F 15/173* (2006.01)
(52) U.S. Cl. ....................................... 709/224; 709/223
(58) Field of Classification Search .................. 709/204, 709/223, 224
See application file for complete search history.

(56) References Cited

U.S. PATENT DOCUMENTS

| | | | |
|---|---|---|---|
| 7,307,820 B2 * | 12/2007 | Henson et al. ................... | 361/42 |
| 7,533,086 B2 * | 5/2009 | Motoyama et al. ................... | 1/1 |
| 2007/0118638 A1 | 5/2007 | Ban et al. | |
| 2008/0061714 A1 * | 3/2008 | Syu et al. ....................... | 315/294 |

FOREIGN PATENT DOCUMENTS

| | | |
|---|---|---|
| CN | 1799012 A | 7/2006 |
| JP | 2001-280674 A | 10/2001 |
| JP | 2002-071198 A | 3/2002 |
| JP | 2002-277028 A | 9/2002 |
| JP | 2004-112298 A | 4/2004 |
| JP | 2005-286872 A | 10/2005 |

OTHER PUBLICATIONS

Chinese Office Action of corresponding Chinese Application No. 200880104734.7 dated Mar. 12, 2012.
Japanese Office Action of corresponding Japanese Application No. 2007-226469 dated Mar. 13, 2012.

* cited by examiner

*Primary Examiner* — Asghar Bilgrami
(74) *Attorney, Agent, or Firm* — Global IP Counselors

(57) ABSTRACT

An air conditioning system includes one or plural device group monitoring targets including one or plural indoor units and an outdoor unit, one or plural connection devices configured to be communicably connected to the indoor unit/units and the outdoor unit and have a unique ID, and a monitoring device configured to be communicably connected to the connection device/devices and have a monitoring memory that stores data received from the connection device/devices. When power supply is started respectively, the connection device/devices respectively performs communication with the indoor unit/units and the outdoor unit to collect configuration type information representing at least the configuration and the type of the device group monitoring target corresponding to the connection device, and respectively transmits the configuration type information to the monitoring device together with the ID of the connection device corresponding to the configuration type information.

11 Claims, 5 Drawing Sheets

AIR CONDITIONING SYSTEM

CROSS-REFERENCE TO RELATED APPLICATIONS

This U.S. National stage application claims priority under 35 U.S.C. §119(a) to Japanese Patent Application No. 2007-226469, filed in Japan on Aug. 31, 2007, the entire contents of which are hereby incorporated herein by reference.

TECHNICAL FIELD

The present invention relates to an air conditioning system for performing monitoring of devices.

BACKGROUND ART

Conventionally, there have been proposed air conditioning systems that monitor air conditioner groups configured from plural indoor units and outdoor units.

For example, in the air conditioning system described in Japanese Patent Application Laid-Open Publication No. 2002-071198 indicated below, in order to read data of air conditioning devices that are installed per floor, a data transmission request instruction is sent from a host monitoring device to the air conditioning devices.

SUMMARY

<Technical Problem>

However, in the air conditioning system described in Japanese Patent Application Laid-Open Publication No. 2002-071198, the assumption ends up being that the data transmission request instruction from the monitoring device is sent.

The present invention has been made in view of the aforementioned point, and it is an object of the present invention to provide an air conditioning system where a monitoring device is capable of monitoring configuration information even when there is no request from the monitoring device.

<Solution to the Problem>

An air conditioning system pertaining to a first aspect of the present invention comprises a device group monitoring target, a connection device and a monitoring device. The device group monitoring target includes one or plural indoor units and an outdoor unit. The connection device is communicably connected to all of the indoor unit/units and the outdoor unit configuring the device group monitoring target and has a unique ID. The monitoring device is communicably connected to the connection device and has a monitoring memory that stores data received from the connection device. Additionally, when power supply is started, the connection device performs communication with all of the indoor unit/units and the outdoor unit to collect configuration type information representing at least one of the configuration and the type of the device group monitoring target and transmits the configuration type information to the monitoring device together with the ID of the connection device. It will be noted that processing to establish a correlation between the configuration type information and the ID of the connection device may be performed by the connection device or may be performed by the monitoring device. It will be noted that, as cases where the connection device performs communication with all of the indoor unit/units and the outdoor unit mentioned here, not only is there included a case where the connection device simply performs communication with the individual indoor unit/units and outdoor unit respectively, but there is also included a case where, for example, the connection device performs, via a certain outdoor unit, communication with that outdoor unit and plural indoor units configuring a refrigerant circuit.

Here, the connection device uses as a trigger a situation where it receives power supply to perform communication with all of the indoor unit/units and the outdoor unit included in the device group monitoring target connected to the connection device, collect configuration type information, and transmit the configuration type information to the monitoring device together with the ID of the connection device.

Thus, it becomes possible for the monitoring device to grasp, even without the monitoring device having to actively collect device configuration information, the most recent information in regard to at least any of the configuration and the type resulting from all of the indoor unit/units and the outdoor unit included in the device group monitoring target communicably connected to the connection device each time power is supplied to the connection device.

An air conditioning system pertaining to a second aspect of the present invention is the air conditioning system of the first aspect of the invention, wherein one of the connection devices is disposed with respect to one of the device group monitoring targets.

Here, the device group monitoring target and the connection device correspond to each other on a one-to-one basis.

Thus, even when a fault or the like in the device group monitoring target is repaired and the device group monitoring target is restored to a state prior to the fault, it becomes possible for the monitoring device to continue management as is at a point in time prior to the fault or the like by referencing the ID of the connection device.

An air conditioning system pertaining to a third aspect of the present invention is the air conditioning system of the first or second aspect of the invention, wherein the monitoring memory establishes a correspondence between and stores the configuration type information and the ID of the connection device. Additionally, the monitoring device overwrites the configuration type information stored in the monitoring memory in correspondence with the ID of the connection device each time the monitoring device receives the configuration type information and the ID of the connection device from the connection device.

Here, even when the configuration of the device group monitoring target is updated because of expansion or the like, the configuration type information is overwritten in the monitoring memory each time, so it becomes possible for the monitoring device to monitor the most recent information.

An air conditioning system pertaining to a fourth aspect of the present invention is the air conditioning system of any of the first to third aspects of the invention, wherein the connection device is built into the device group monitoring target.

Here, the connection device is built into the device group monitoring target together with the indoor unit/units and the outdoor unit, so the configuration can be simplified.

An air conditioning system pertaining to a fifth aspect of the present invention comprises a device group monitoring target, a connection device and a monitoring device. The device group monitoring target includes one or plural indoor units and an outdoor unit. The connection device is connected to, so as to be capable of maintaining a state of communication with, all of the indoor unit/units and the outdoor unit and has a unique ID. The monitoring device is communicably connected to the connection device and has a monitoring memory that stores data received from the connection device. Additionally, when communication with at least any one of the indoor unit/units and the outdoor unit becomes unestablished, the connection device collects configuration type information representing at least one of the configuration and the type of the device group monitoring target communicably connected to the connection device and transmits the configuration type information to the monitoring device together with the ID of the connection device. It will be noted that processing to establish a correlation between the configuration type information and the ID of the connection device may be performed by the connection device or may be performed by the monitoring device. It will be noted that, as cases where the connection device performs communication with all of the indoor unit/units and the outdoor unit mentioned here, not only is there included a case where the connection device simply performs communication with the individual indoor unit/units and outdoor unit respectively, but there is also included a case where, for example, the connection device performs, via a certain outdoor unit, communication with that outdoor unit and plural indoor units configuring a refrigerant circuit.

Here, the connection device uses as a trigger a situation where communication with at least any one of the indoor unit/units and the outdoor unit becomes unestablished to collect configuration type information in regard to the device group monitoring target communicably connected to the connection device and transmit the configuration type information to the monitoring device together with the ID of the connection device.

Thus, it becomes possible for the monitoring device to grasp, even without the monitoring device having to actively collect device configuration information, the most recent information in regard to at least any of the configuration and the type resulting from all of the indoor unit/units and the outdoor unit included in the device group monitoring target communicably connected to the connection device each time there arises a device where communication with the connection device becomes unestablished.

<Advantageous Effects of the Invention>

In the air conditioning system of the first aspect of the invention, it becomes possible for the monitoring device to grasp, even without the monitoring device having to actively collect device configuration information, the most recent information in regard to at least any of the configuration and the type resulting from all of the indoor unit/units and the outdoor unit included in the device group monitoring target communicably connected to the connection device each time power is supplied to the connection device.

In the air conditioning system of the second aspect of the invention, even when a fault or the like in the device group monitoring target is repaired and the device group monitoring target is restored to a state prior to the fault, it becomes possible for the monitoring device to continue management as is at a point in time prior to the fault or the like by referencing the ID of the connection device.

In the air conditioning system of the third aspect of the invention, even when the configuration of the device group monitoring target is updated because of expansion or the like, the configuration type information is overwritten in the monitoring memory each time, so it becomes possible for the monitoring device to monitor the most recent information.

In the air conditioning system of the fourth aspect of the invention, the configuration can be simplified.

In the air conditioning system of the fifth aspect of the invention, it becomes possible for the monitoring device to automatically perform grasping of changes in the configuration type information without having to actively collect device configuration information.

DETAILED DESCRIPTION OF EMBODIMENT(S)

<General Configuration of Air Conditioning System 100>

Figure 1:
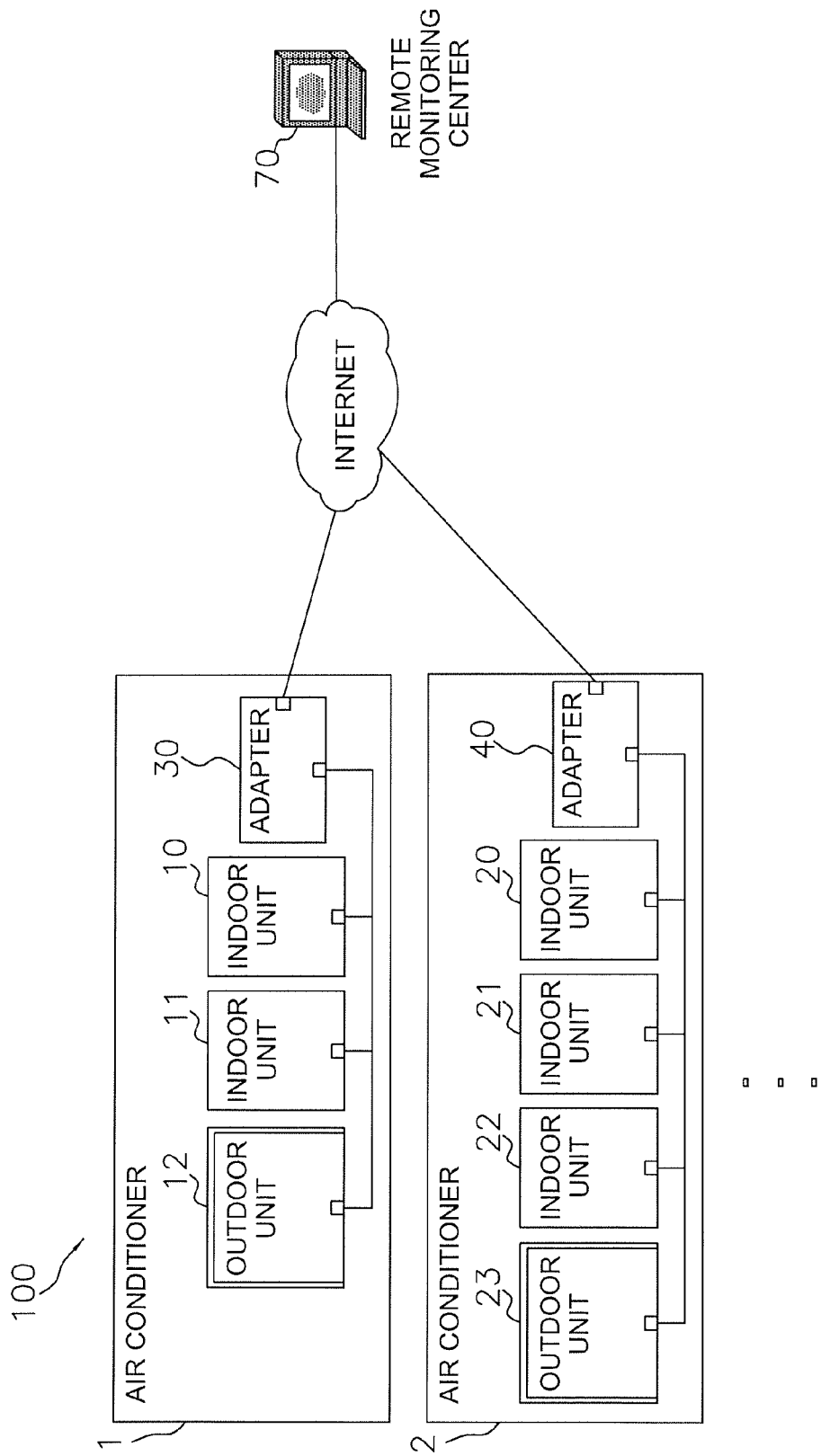
FIG. 1 is a system general configuration diagram pertaining to an embodiment of the present invention.

FIG. 1 shows a general configuration diagram of an air conditioning system 100 in which an embodiment of the present invention is employed.

The air conditioning system 100 is a system that remotely performs monitoring and management of air conditioners 1 and 2 that are control targets and is equipped with a remote monitoring center 70 and the air conditioners 1 and 2.

The remote monitoring center 70 is communicably connected to an adapter 30 of the air conditioner 1 and an adapter 40 of the air conditioner 2 via the Internet respectively.

The air conditioner 1 has the adapter 30, one outdoor unit 12 and two indoor units 10 and 11 and is a device group monitoring target that is monitored and managed by the remote monitoring center 70. Here, the two indoor units 10 and 11 are respectively connected by a refrigerant pipe to, and cooperate with, the outdoor unit 12, whereby one refrigerant system is configured by the device group comprising these three devices. The adapter 30 is communicably connected via a local network to the outdoor unit 12 and the indoor units 10 and 11.

The air conditioner 2 has the adapter 40, one outdoor unit 23 and three indoor units 20, 21 and 22 and is a device group monitoring target that is monitored and managed by the remote monitoring center 70. Here, the three indoor units 20, 21 and 22 are respectively connected by a refrigerant pipe to, and cooperate with, the outdoor unit 23, whereby one refrigerant system that is separate from that of the aforementioned air conditioner 1 is configured by the device group comprising these four devices. The adapter 40 is communicably connected via a local network to the outdoor unit 23 and the indoor units 20, 21 and 22. Here, in the air conditioner 2, there is employed a system configuration where one more indoor unit than in the refrigerant system of the air conditioner 1 is connected as a result of the three indoor units 20, 21 and 22 being connected to the one outdoor unit 23.

Figure 2:
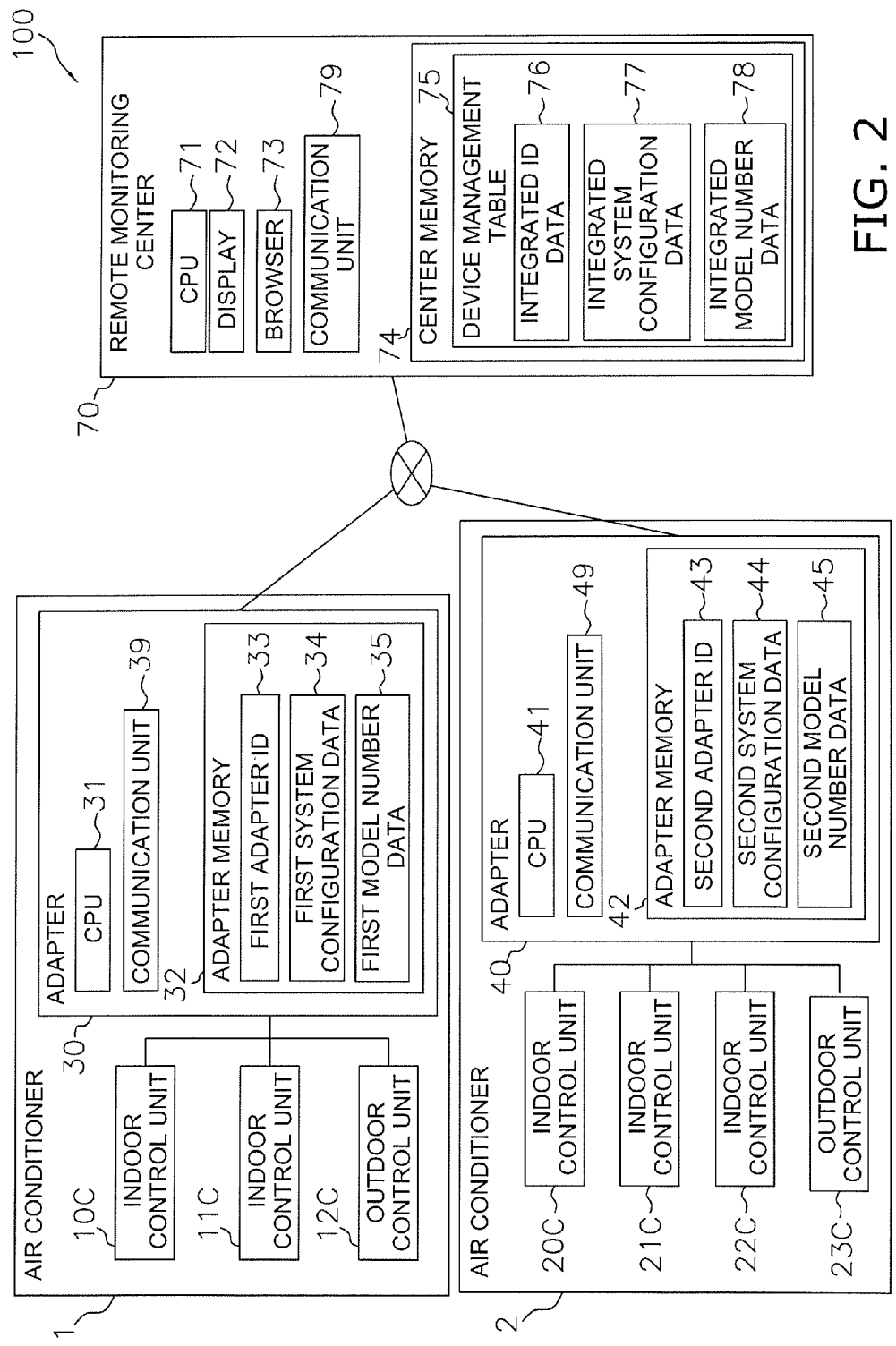
FIG. 2 is a general functional block diagram of an air conditioning system.

FIG. 2 shows a functional block configuration diagram of the air conditioning system 100.

In the air conditioner 1, an outdoor control unit 12C built into the outdoor unit 12, an indoor control unit 10C built into the indoor unit 10, an indoor control unit 11C built into the indoor unit 11 and the adapter 30 are communicably interconnected via a local network. The adapter 30 has a CPU 31, an adapter memory 32 and a communication unit 39. The indoor control units 10C, 11C and the outdoor control unit 12C receive control commands from the CPU 31 of the adapter 30 and drive and control each component. For example, there are control items such as cooling operation, heating operation, setting temperature, air volume, and air direction. Further, a unique first adapter ID 33 is given beforehand to the adapter 30 and stored in the adapter memory 32. This adapter memory 32 stores system configuration data 34 and first model number data 35 of the refrigerant system of the air conditioner 1 that are acquired by communication with the indoor control units 10C, 11C and the outdoor control unit 12C. Here, the system configuration data 34 are configuration information of each device configuring the air conditioner 1 and here are information representing that the refrigerant system configuration is one where the two indoor units 10 and 11 are connected with respect to the one outdoor unit 12. Further, the first model number data 35 are information representing model numbers corresponding to the models, serial numbers and the like of the outdoor unit 12 and the indoor units 10 and 11 configuring the air conditioner 1. It will be noted that an unillustrated controller is disposed in the air conditioner 1, such that the user can operate this controller to input predetermined instructions. For example, the user can operate the controller to input an instruction to perform test operation or the like. Further, in the air conditioner 1, because the adapter 30 is built into the air conditioner 1, the configuration can be simplified over a case where the adapter is given a separate configuration.

The air conditioner 2 has substantially the same configuration as that of the air conditioner 1, and an outdoor control unit 23C built into the outdoor unit 23, an indoor control unit 20C built into the indoor unit 20, an indoor control unit 21C built into the indoor unit 21, an indoor control unit 22C built into the indoor unit 22 and the adapter 40 are communicably interconnected via a local network. The adapter 40 has a CPU 41, an adapter memory 42 and a communication unit 49. The indoor control units 20C, 21C and 22C and the outdoor control unit 23C receive control commands from the CPU 41 of the adapter 40 and drive and control each component. Control here is the same as in the air conditioner 1; for example, there are control items such as cooling operation, heating operation, setting temperature, air volume, and air direction. Further, a unique second adapter ID 43 that is separate from the first adapter ID 33 is given beforehand to the adapter 40 and stored in the adapter memory 42. This adapter memory 42 stores system configuration data 44 and second model number data 45 of the refrigerant system of the air conditioner 2 that are acquired by communication with the indoor control units 20C, 21C and 22C and the outdoor control unit 23C. Here, the system configuration data 44 are, similar to those of the air conditioner 1, configuration information of each device configuring the air conditioner 2 and here are information representing that the refrigerant system configuration is one where the three indoor units 20, 21 and 22 are connected with respect to the one outdoor unit 23. Further, the second model number data 45 are information representing model numbers corresponding to the models, serial numbers and the like of the outdoor unit 23 and the indoor units 20, 21 and 22 configuring the air conditioner 2. It will be noted that, similar to the air conditioner 1, an unillustrated controller is disposed in the air conditioner 2, such that the user can operate this controller to input predetermined instructions. For example, the user can operate the controller to input an instruction to perform test operation or the like. Further, in the air conditioner 2, because the adapter 40 is built into the air conditioner 2, the configuration can be simplified over a case where the adapter is given a separate configuration.

The remote monitoring center 70 is a device for remotely monitoring and managing the air conditioner 1 and the air conditioner 2 by communication via the Internet and is equipped with a CPU 71, a display 72, a browser 73, a center memory 74 and a communication unit 79. In the center memory 74, there is stored a device management table 75 in which data that the communication unit 79 acquires from each of the air conditioners 1 and 2 by performing communication with the communication units 39 and 49 of each of the adapters 30 and 40 of the air conditioners 1 and 2 via the Internet are organized separately by the first adapter ID 33 and the second adapter ID 43. Additionally, the CPU 71 starts up the browser 73 on the basis of the device management table 75 stored in this center memory 74 to display on and output to the display 72 data for monitoring and for management. Here, the device management table 75 has integrated ID data 76, integrated system configuration data 77 and integrated model number data 78. Here, the integrated ID data 76 are data for distinguishing the data of each of the air conditioners 1 and 2 in accordance with the first adapter ID 33 and the second adapter ID 43 in order to perform monitoring and management in which the systems of the air conditioners 1 and 2 corresponding to each of the adapters 30 and 40 are clearly distinguished on the basis of respective IDs of each of the first adapter ID 33 and the second adapter ID 43 allocated beforehand with respect to the adapters 30 and 40 of each of the air conditioners 1 and 2. The integrated system configuration data 77 are data in which information representing the configuration data of the refrigerant systems of each of the air conditioners 1 and 2 is organized. The integrated model number data 78 are data in which information representing the model numbers of the components of each of the air conditioners 1 and 2 is organized. Here, the integrated system configuration data 77 and the integrated model number data 78 are correlated with the aforementioned integrated ID data 76 and stored in the center memory 74.

<Flowchart of Monitoring/Management of Air Conditioning System 100>

Figure 3:
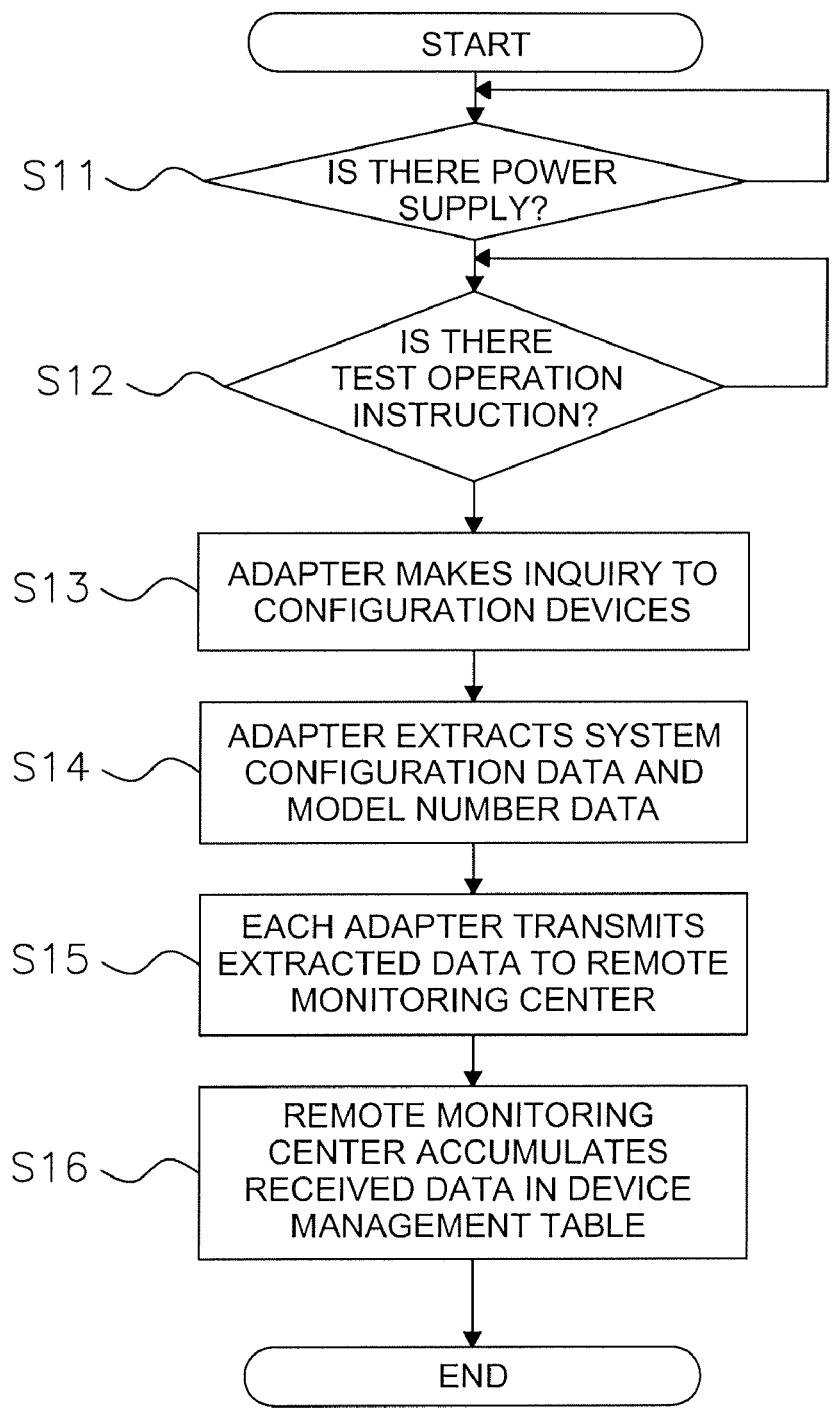
FIG. 3 is a general flowchart for monitoring/management.

FIG. 3 shows a flowchart of monitoring/management that the air conditioning system 100 performs.

Processing for management/monitoring that this air conditioning system 100 performs is processing that performs monitoring/management of the air conditioners 1 and 2 at a predetermined timing—for example, at the time of startup when power is applied or at the time of test operation—as a result of each of the air conditioners 1 and 2 independently transmitting their own system configuration data and model number data to the remote monitoring center 70 and the remote monitoring center 70 continuing to accumulate these data.

In step S11, each of the air conditioners 1 and 2 judges whether or not power is being supplied to it. Specifically, it is judged whether or not the adapters 30 and 40 of each of the air conditioners 1 and 2 are receiving power supply. Here, the air conditioner 1 or the air conditioner 2 moves to step S12 when it judges that the CPU 31 or 41 of the adapter 30 or 40 is receiving power supply. Here, for the purpose of explanation, FIG. 3 simply shows a flowchart without dividing it into the air conditioner 1 and the air conditioner 2 (the same is true below).

In step S12, each of the air conditioners 1 and 2 judges whether or not an instruction to perform test operation has been inputted from the controller. Here, the air conditioner 1 or the air conditioner 2 moves to step S13 when it judges that the CPU 31 or 41 of the adapter 30 or 40 has received an instruction to perform test operation.

In step S13, the CPU 31 of the adapter 30 that is receiving power supply and starts test operation performs, by the communication unit 39, communication with all of the control units (the outdoor control unit 12C and the indoor control units 10C and 11C) to which it is connected to make an inquiry with respect to all of the connected devices as to the connection status in order to check the system configuration of the air conditioner (the air conditioner 1) to which it belongs. The CPU 41 of the adapter 40 that is receiving power supply and starts test operation also similarly performs, by the communication unit 49, communication with all of the control units (the outdoor control unit 23C and the indoor control units 20C, 21 C and 22C) to which it is connected to make an inquiry with respect to all of the connected devices as to the connection status in order to check the system configuration of the air conditioner (the air conditioner 2) to which it belongs.

In step S14, in regard to the air conditioner 1, the communication unit 39 of the adapter 30 receives replies from the outdoor control unit 12C and the indoor control units 10C and 11C that belong to its refrigerant system and are connected to it. Then, the CPU 31 uses these received data to create, and store in the adapter memory 32, the first system configuration data 34 configuring the refrigerant system of the air conditioner 1. Further, the CPU 31 uses the data that the communication unit 39 of the adapter 30 has received by communication with each of these configuration devices to create, and store in the adapter memory 32, the first model number data 35 in regard to each of the components of the air conditioner 1. Further, similarly in regard also to the air conditioner 2, the communication unit 49 of the adapter 40 receives replies from the outdoor control unit 23C and the indoor control units 20C, 21C and 22C that belong to its refrigerant system and are connected to it. Then, the CPU 41 uses these received data to create, and store in the adapter memory 42, the second system configuration data 44 configuring the refrigerant system of the air conditioner 2. Further, the CPU 41 uses the data that the communication unit 49 of the adapter 40 has received by communication with each of these configuration devices to create, and store in the adapter memory 42, the second model number data 45 in regard to each of the components of the air conditioner 2.

In step S15, in regard to the air conditioner 1, the communication unit 39 of the adapter 30 correlates, with the first adapter ID allocated beforehand to the adapter 30, the first system configuration data 34 and the first model number data 35 stored in the adapter memory 32 and transmits the first system configuration data 34 and the first model number data 35 together with the first adapter ID via the Internet to the remote monitoring center 70. Further, similarly in regard also to the air conditioner 2, the communication unit 49 of the adapter 40 correlates, with the second adapter ID allocated beforehand to the adapter 40, the second system configuration data 44 and the second model number data 45 stored in the adapter memory 42 and transmits the second system configuration data 44 and the second model number data 45 together with the second adapter ID via the Internet to the remote monitoring center 70.

In step S16, the CPU 71 of the remote monitoring center 70 uses the data received from the adapters 30 and 40 of each of the air conditioners 1 and 2 to create the device management table 75 per adapter ID while distinguishing the data with which the adapter IDs of each of the adapters 30 and 40 have been correlated, stores the device management table 75 in the center memory 74, and continues accumulating data. The CPU 71 starts up the browser 73 on the basis of the device management table 75 stored in this center memory 74 to cause the data to be displayed on and outputted to the display 72 and performs remote monitoring and management.

The above processing can always monitor the most recent information because the device management table 75 continues to be overwritten and updated on the basis of the adapter IDs each time there is power supply and test operation is performed.

<Characteristics of Air Conditioning System 100 Pertaining to Present Embodiment>

(1)

In the air conditioning system 100 pertaining to the present embodiment, each time power is applied to each of the air conditioners 1 and 2 and a test operation instruction is given from the controllers, the adapters 30 and 40 of each of the air conditioners 1 and 2 themselves automatically transmit, to the remote monitoring center 70, the device configuration data 34, 44 and the model number data 35, 45 that have been correlated with their own adapter IDs. Additionally, each time the remote monitoring center 70 receives data from each of the adapters 30 and 40, the remote monitoring center 70 continues accumulating the data in the device management table 75. For this reason, the remote monitoring center 70 can always automatically grasp, without itself having to perform information collection from the adapters 30 and 40, the most recent information in regard to the system configurations and model numbers resulting from all of the indoor units 10, 11, 20, 21 and 22 and the outdoor units 12 and 23 included in the air conditioners 1 and 2 communicably connected to the adapters 30 and 40 each time power is supplied to the adapters 30 and 40 and test operation is performed.

(2)

In the air conditioning system 100 pertaining to the present embodiment, the remote monitoring center 70 performs monitoring and management of each of the air conditioners 1 and 2 on the basis of the adapter IDs of the adapters 30 and 40 that are disposed for each of the air conditioners 1 and 2. For this reason, even if a faulty indoor unit or the like needs to be updated to an indoor unit or the like that is normally driven, such as when a fault occurs in an indoor unit or the like configuring the system in the air conditioners 1 and 2 and the faulty indoor unit or the like is no longer driven, it is not necessary for the user to have to go to the trouble of performing work to update and input data by "update indoor unit" with respect to the remote monitoring center 70 because the contents of the system configurations of the monitoring targets are held in the device management table 75 of the remote monitoring center 70.

(3)

In the air conditioning system 100 pertaining to the present embodiment, the remote monitoring center 70 grasps the model numbers of each of the air conditioners 1 and 2 on the basis of the adapter IDs of the adapters 30 and 40 that are disposed for each of the air conditioners 1 and 2. For this reason, even when a new component is prepared for repair, such as when a component such as an indoor unit configuring the system in the air conditioners 1 and 2 fails, a service engineer performing the repair can easily grasp the necessary component on the basis of the model number data because the model number data of the components of the monitoring targets are stored in the device management table 75 of the remote monitoring center 70.

(4)

In the air conditioning system 100 pertaining to the present embodiment, each time test operation resulting from power application is performed, the system configuration data 34 and 44 of each of the air conditioners 1 and 2 are automatically transmitted to the remote monitoring center 70. For this reason, for example, in the air conditioner 1, even when a change arises in the system configuration as a result of expanding the number of indoor units, when power is supplied and test operation is started after the expansion, it becomes possible for the remote monitoring center 70 to continue to accumulate, in the device management table 75, data of the new system configuration in which the number of indoor units has been expanded. Thus, in the remote monitoring center 70, even when a change arises in the system configuration because of device expansion or the like, the device management table 75 stored in the center memory 74 automatically becomes updated without the user having to perform work to directly input the system configuration data to be updated in the remote monitoring center 70, and monitoring and management become easy.

<Modifications of Air Conditioning System 100>

An embodiment of the present invention has been described above on the basis of the drawings, but the specific configurations thereof are not limited to this embodiment and are alterable within a scope that does not depart from the gist of the invention.

(A)

In the preceding embodiment, as shown in FIG. 1 and FIG. 2, a case where the adapters 30 and 40 are built into the air conditioners 1 and 2 has been taken as an example and described.

Figure 4:
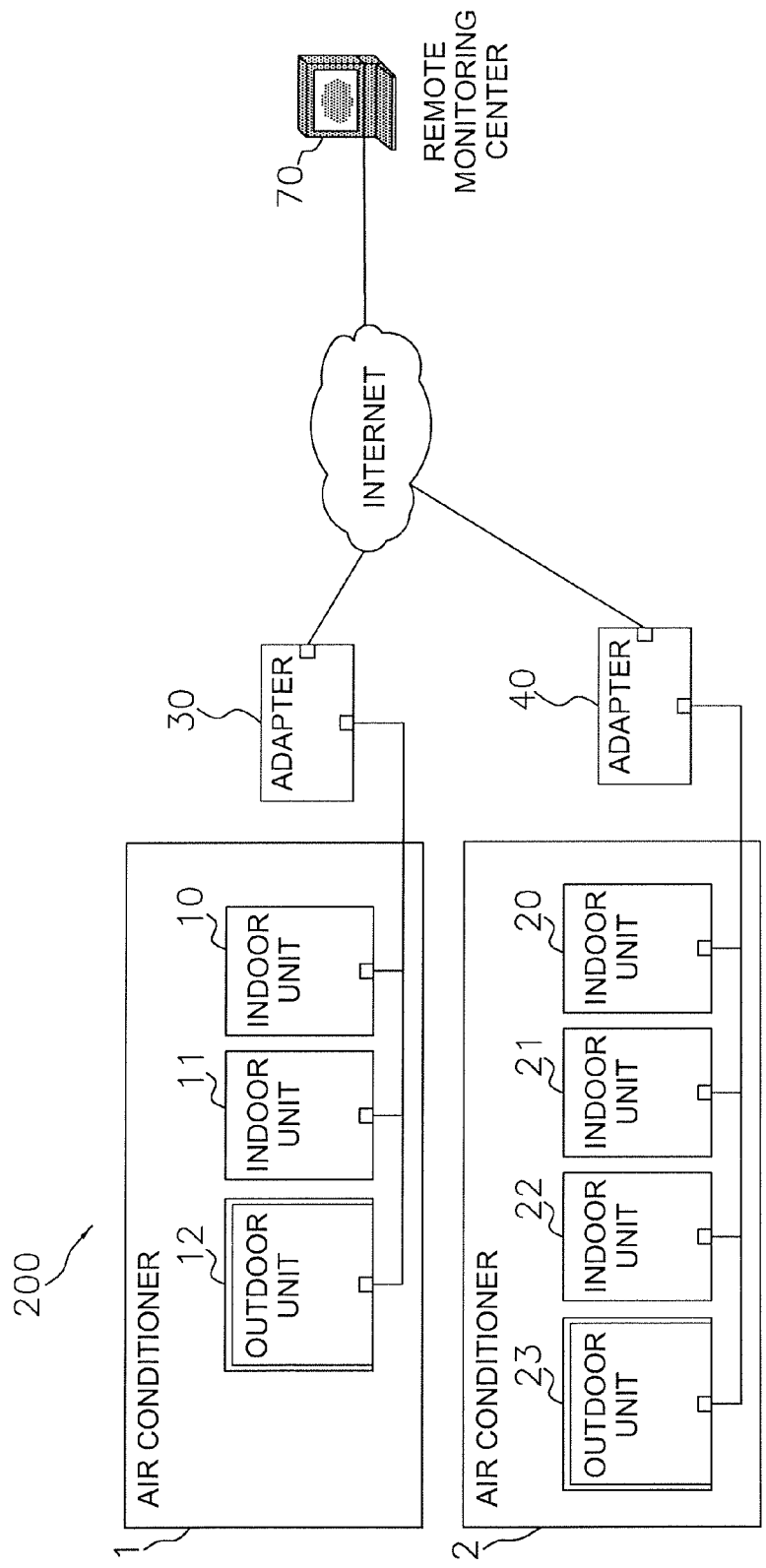
FIG. 4 is a general configuration diagram of an air conditioning system pertaining to modification (A).
Figure 5:
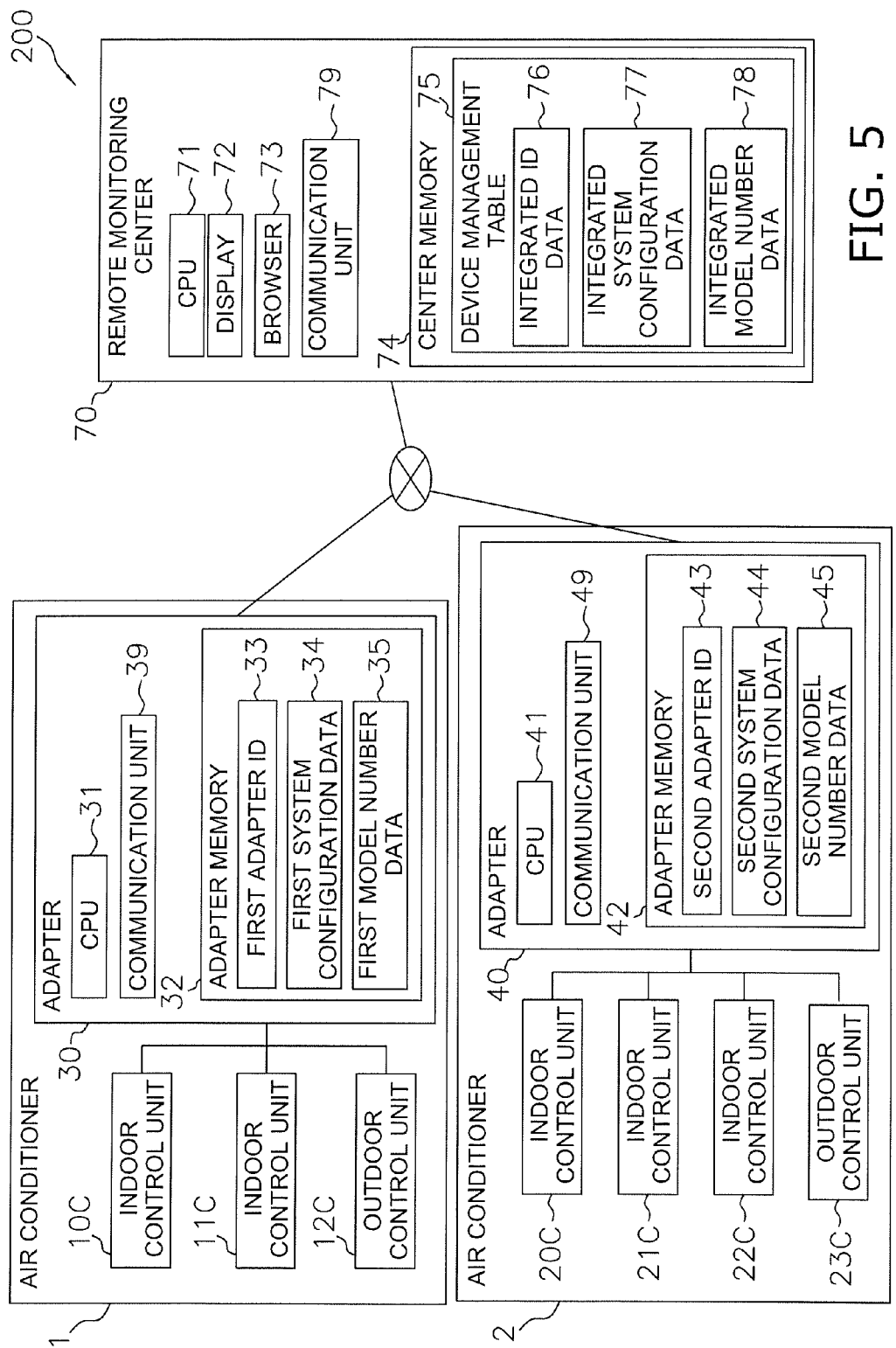
FIG. 5 is a general functional block diagram of the air conditioning system pertaining to modification (A).

However, the present invention is not limited to this and may also, as shown in FIG. 4 and FIG. 5, be configured as an air conditioning system 200 where the adapters 30 and 40 are communicably disposed as separate entities from the air conditioners 1 and 2. Even in this case, the same effects as those of the air conditioning system 100 of the preceding embodiment can be achieved.

(B)

In the preceding embodiment, a case where the communication unit 39 of the adapter 30 correlates, with the first adapter ID allocated beforehand to the adapter 30, the first system configuration data 34 and the first model number data 35 stored in the adapter memory 32 and transmits the first system configuration data 34 and the first model number data 35 together with the first adapter ID to the remote monitoring center 70 has been taken as an example and described.

However, the present invention is not limited to this and may also be configured such that, for example, the adapter 30 does not correlate, with the first adapter ID allocated beforehand to the adapter 30, the first system configuration data 34 and the first model number data 35 stored in the adapter memory 32 but transmits the first system configuration data 34 and the first model number data 35 respectively via the Internet to the remote monitoring center 70 and such that the CPU 71 of the remote monitoring center 70 that has received these data performs processing to correlate the first system configuration data 34 and the first model number data 35 with the first adapter ID and stores the data and ID in the center memory 74. Even in this case, the same effects as those of the preceding embodiment can be achieved.

(C)

In the preceding embodiment, a case where the adapter 30 uses as a trigger the start of power supply to correlate the first system configuration data 34 and the first model number data 35 with the first adapter ID allocated beforehand to the adapter 30 and transmits the first system configuration data 34 and the first model number data 35 together with the first adapter ID via the Internet to the remote monitoring center 70 and where the adapter 40 also transmits in the same manner has been taken as an example and described.

However, the present invention is not limited to this and may also be configured such that, for example, the adapter 30 uses as a trigger (the CPU 31 detects) a situation where the state of communication with any of the indoor control units 10C, 11C and the outdoor control unit 12C connected via a communication line to the adapter 30 ceases and communication becomes unestablished and such that the adapter 30 correlates, with the first adapter ID allocated beforehand to the adapter 30, the first system configuration data 34 and the first model number data 35 in regard to a target where communication with the adapter 30 is established and transmits the first system configuration data 34 and the first model number data 35 together with the first adapter ID via the Internet to the remote monitoring center 70. The same is also true in regard to the adapter 40.

By configuring the air conditioning system in this manner, the remote monitoring center 70 can automatically grasp, without itself having to perform information collection from the adapters 30 and 40, the most recent information in regard to the system configurations and the model numbers resulting from all of the indoor units 10, 11, 20, 21 and 22 and the outdoor units 12 and 23 included in the air conditioners 1 and 2 communicably connected to the adapters 30 and 40 when there arises an indoor unit or outdoor unit in which the establishment of communication has ceased.

Industrial Applicability

By utilizing the present invention, it is possible for a monitoring device to monitor configuration information even when there is no request from the monitoring device, so the present invention is particularly useful in the monitoring and management of an air conditioning system that is configured from plural outdoor units and indoor units.

What is claimed is:

1. An air conditioning system comprising:
   a first device group monitoring target including one or plural first indoor units and a first outdoor unit connected with the first indoor unit/units to configure one refrigerant system;
   a first connection device configured to be communicably connected to the first indoor unit/units and the first outdoor unit and having a unique first ID;
   a second device group monitoring target including one or plural second indoor units and a second outdoor unit connected with the second indoor unit/units to configure another refrigerant system;
   a second connection device configured to be communicably connected to the second indoor unit/units and the second outdoor unit and having a unique second ID; and
   a monitoring device configured to be communicably connected to the first connection device, the second connection device and having a monitoring memory that stores data received from the first connection device and the second connection device,
   each time when power supply is started to the first connection device,
      the first connection device performs communication with the first indoor unit/units and the first outdoor unit to collect first configuration type information representing at least one of the configuration and the type of the first device group monitoring target corresponding to the first connection device and
      the first connection device transmits the first configuration type information to the monitoring device together with the first ID of the first connection device corresponding to the first configuration type information, and
   each time when power supply is started to the second connection device,
      the second connection device performs communication with the second indoor unit/units and the second outdoor unit to collect second configuration type information representing at least one of the configuration and the type of the second device group monitoring target corresponding to the second connection device and
      the second connection device transmits the second configuration type information to the monitoring device together with the second ID of the second connection device corresponding to the second configuration type information.

2. The air conditioning system according to claim 1, wherein
the first and second connection devices are disposed with respect to the first and second device group monitoring targets on a one-to-one basis.

3. The air conditioning system according to claim 1, wherein
the monitoring memory establishes a correspondence between and stores the configuration type information and the first ID of the first connection device,
the monitoring memory establishes a correspondence between and stores the configuration type information and the second ID of the second connection device,
the monitoring device overwrites the configuration type information stored in the monitoring memory in correspondence with the first ID of the first connection device each time the monitoring device receives the configuration type information and the first ID of the first connection device from the first connection device, and
the monitoring device overwrites the configuration type information stored in the monitoring memory in correspondence with the second ID of the second connection device each time the monitoring device receives the configuration type information and the second ID of the second connection device from the second connection device.

4. The air conditioning system according to claim 1, wherein
the first and second connection devices are built into the first and second device group monitoring targets, respectively.

5. An air conditioning system comprising:
a first device group monitoring target including one or plural first indoor units and first outdoor unit connected with the first indoor unit/units to configure one refrigerant system;
a first connection device configured to be connected to the first indoor unit/units and the first outdoor unit such that the first connection device is capable of maintaining a state of communication therewith and having a unique first ID;
a second device group monitoring target including one or plural second indoor units and a second outdoor unit connected with the second indoor unit/units to configure another refrigerant system;
a second connection device configured to be connected to the second indoor unit/units and the second outdoor unit such that the second connection device is capable of maintaining a state of communication therewith and having a unique second ID; and
a monitoring device configured to be communicably connected to the first connection device, the second connection device and having a monitoring memory that stores data received from the first connection device and the second connection device,
each time when the first connection device detects a situation that communication with at least any one of the first indoor unit/units and the first outdoor unit becomes unestablished,
the first connection device collects first configuration type information representing at least one of the configuration and the type of the first device group monitoring target communicably connected to the first connection device corresponding to the first device group monitoring target and
the first connection device transmits the first configuration type information to the monitoring device together with the first ID of the first connection device corresponding to the first configuration type information, and
each time when the second connection device detects a situation that communication with at least any one of the second indoor unit and the second outdoor unit becomes unestablished,
the second connection device collects second configuration type information representing at least one of the configuration and the type of the second device group monitoring target communicably connected to the second connection device corresponding to the second device group monitoring target and
the second connection device transmits the second configuration type information to the monitoring device together with the second ID of the second connection device corresponding to the second configuration type information.

6. The air conditioning system according to claim 2, wherein
the monitoring memory establishes a correspondence between and stores the configuration type information and the first ID of the first connection device,
the monitoring memory establishes a correspondence between and stores the configuration type information and the second ID of the second connection device,
the monitoring device overwrites the configuration type information stored in the monitoring memory in correspondence with the first ID of the first connection device each time the monitoring device receives the configuration type information and the first ID of the first connection device from the first connection device, and
the monitoring device overwrites the configuration type information stored in the monitoring memory in correspondence with the second ID of the second connection device each time the monitoring device receives the configuration type information and the second ID of the second connection device from the second connection device.

7. The air conditioning system according to claim 6, wherein
the first and second connection devices are built into the first and second device group monitoring targets, respectively.

8. The air conditioning system according to claim 2, wherein
the first and second connection devices are built into the first and second device group monitoring targets, respectively.

9. The air conditioning system according to claim 3, wherein
the first and second connection devices are built into the first and second device group monitoring targets, respectively.

10. The air conditioning system according to claim 1, wherein
only when power supply is started to the first connection device,
the first connection device performs communication with the first indoor unit/units and the first outdoor unit to collect the first configuration type information and
the first connection device transmits the first configuration type information to the monitoring device together with the first ID, and only when power supply is started to the second connection device,
- the second connection device performs communication with the second indoor unit/units and the second outdoor unit to collect the second configuration type information and
- the second connection device transmits the second configuration type information to the monitoring device together with the second ID.

11. The air conditioning system according to claim 5, wherein
- each time when the first connection device detects the situation that communication with at least any one of the first indoor unit/units and the first outdoor unit becomes unestablished,
- the first connection device collects the first configuration type information and
- the first connection device transmits the first configuration type information to the monitoring device together with the first ID, and
- each time when the second connection device detects the situation that communication with at least any one of the second indoor unit and the second outdoor unit becomes unestablished,
- the second connection device collects the second configuration type information and
- the second connection device transmits the second configuration type information to the monitoring device together with the second ID.

* * * * *